United States Patent Office

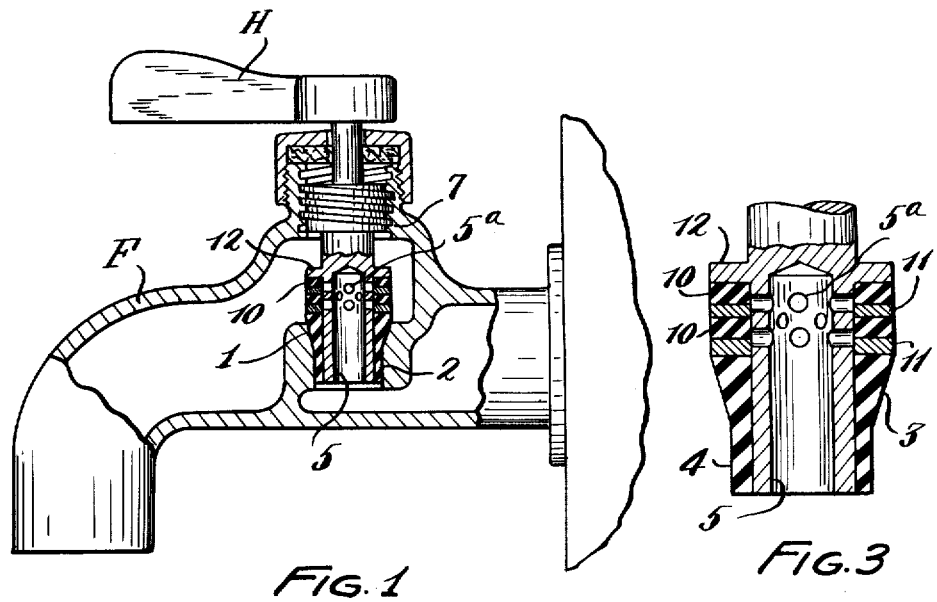
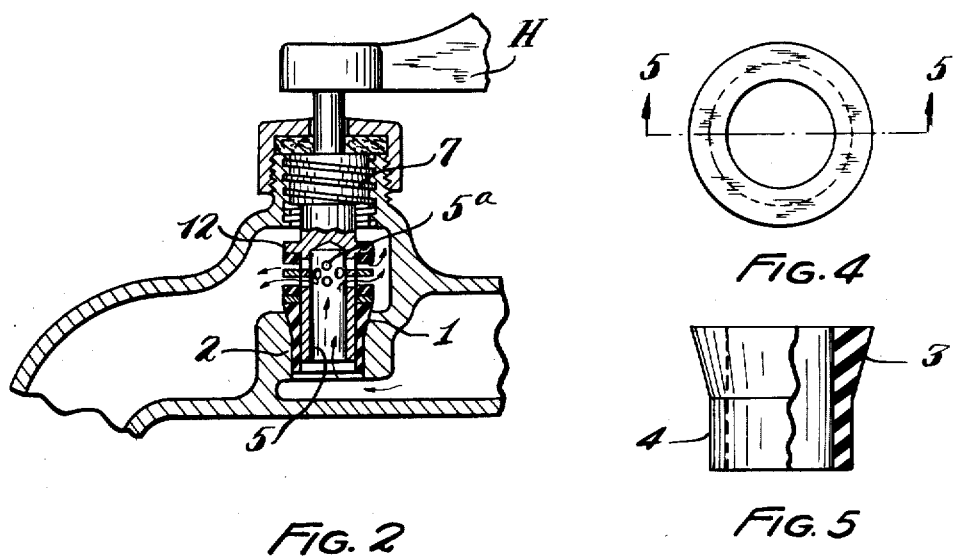

2,768,645
Patented Oct. 30, 1956

2,768,645

VALVE STRUCTURE

Herman S. Cahen and Alfred B. Cahen,
University Heights, Ohio

Application August 24, 1953, Serial No. 375,972

2 Claims. (Cl. 137—625.39)

This invention relates to the class of valves and particularly this improvement is for a faucet.

As is no doubt well known, the gasket in the present-day faucet has to be renewed quite frequently due to wear from its grinding action upon its seat as it is turned to closed position. Such wear of course means leakage and corresponding wear upon the thread of the closure means.

It is therefore the object of our present invention to devise a faucet valve in which there may be an effective opening and closing of the valve without undue wear upon the gasket means and the screw thread of the closure means so as to ensure more dependable sealing engagement and longer life of usefulness.

A further object is to devise such a faucet valve in which the gasket means is so constructed and arranged that it will afford an effective and dependable seal when closed and in which the water pressure may be depended upon to assist in initiating and increasing the opening of the valve and hence the flow of the liquid therethrough as the valve is opened.

Another object is to devise such a faucet valve in which there is movement of the sealing gasket means during the opening of the valve and also during the closing of the same so as to thereby maintain the elastic sealing means in live condition over a prolonged period of time.

Another object is to devise such a faucet valve in which there is precluded danger of the several separate sealing gaskets adhering together, thereby ensuring prompt and dependable initiation and augmentation of the flow upon manipulation of the faucet.

Another object is to devise such a faucet valve in which there may be obtained a flow therethrough without turning the valve closure member to such a great extent as is required in at least some of the prior devices.

Other objects will appear from the following description and claims when considered together with the accompanying drawing.

Fig. 1 is a view, partly broken away, showing our valve assembly in closed position;

Fig. 2 is a similar view in open position;

Fig. 3 is an enlarged view of a part of Fig. 1;

Fig. 4 is a top plan view of one of the gaskets;

Fig. 5 is a view corresponding to line 5—5 of Fig. 4.

The conventional form of faucet which is here indicated in a general way by reference letter F, is provided in the present invention with a conical seat 1 and a cylindrical portion 2 extending downwardly from the lower end thereof. Within this seat there is adapted to rest a sealing gasket of rubber or other elastic sealing material with a correspondingly formed outer conical surface 3 adapted for effective seating engagement upon the conical surface 1 and a cylindrical depending portion 4 that is adapted to be received snugly within the corresponding cylindrical portion 2 of the faucet. As will be seen, this gasket of plain form at both its upper and lower ends, is entirely free for accommodating and compensating action during manipulation of the same.

The sealing gasket, just referred to, has its inner surface of cylindrical form throughout its entire extent and is adapted for mounting snugly upon the cylindrical depending portion 5 of the valve closing member which has screw-threaded engagement 7 with the faucet F; and there is provided a conventional form of handle H for manipulation of the same in the usual manner.

The cylindrical portion 5 is of hollow form and is open at its lower end and closed at its upper end. The upper part of this hollow portion 5 is provided with a plurality of openings 5a through the wall thereof so as to permit flow of the liquid outwardly therethrough. Also, upon the cylindrical portion 5 there are a plurality of alternating annular gaskets 10 of elastic sealing material, as for instance rubber, and washers 11 of rust-proof material as for instance brass. The uppermost gasket element is of rubber and is adapted for bearing engagement against the annular flange 12 at the upper end of the cylindrical portion 5; and the lowermost one of these gasket elements is of brass and is adapted for engagement against the upper end of the gasket that has the conical outer surface portion, this gasket at its upper end being of substantially the same diameter as the other annular sealing elements just referred to.

These parts are so constructed and arranged that when the handle H is turned so as to bring the valve to closed position, the lowermost gasket will have its conical seat-engaging portion brought into effective engagement with the conical seat 1; and continued turning of the valve towards closed position will cause the cylindrical portion 5 to move down further through the sealing elements and to effect clamping sealing engagement of the annular members 10 and 11 between the annular flange 12 and the upper end of the lowermost gasket that has the conical portion. In such closed position the holes 5a are all closed and sealed by the compressed annular gasket and washers 10 and 11 and the lowermost gasket which bears against the conical seat 1. Thus there is an effective seal.

Then upon turning the handle H toward open position, the pressure of the flange 12 upon the annular gasket and washer elements and in turn upon the valve seat 1 is relieved and the force of the water or other liquid up through the hollow portion 5 and out through the holes 5a will separate the annular members 10 and 11 and the lowermost gasket and the liquid will be permitted to flow out therebetween for discharge of the same from the nozzle of the faucet. Such flow will be initiated as soon as there is sufficient turning of the handle to permit such separation of the sealing elements in the manner just explained, while the lower end of the cylindrical portions 4 and 5 remain within the cylindrical portion 2 of the valve seat so as to ensure centering engagement at all times.

With our present form of faucet valve, there is no sharp edge against which the sealing gasket is turned but the sealing engagement is effected in our present device over an extended smooth conical surface area and between the flat surfaces of the annular elements 10 and 11 which are engaged between the flange 12 and the top surface of the lowermost sealing gasket, as above explained. The openings 5a permit instant discharge of the liquid as the sealing elements are readily separated from each other by the force of the liquid upon initiation of the opening of the valve; and there is no disturbance of the true alignment and centering relation of the elements of this structure. Also, the movement of the rubber gaskets relatively to the cylindrical portion 5 during the opening and closing of the valve will prevent them from becoming set or crystallized and hence the life of the same will be materially lengthened as compared with other such devices.

What we claim is:

1. A valve structure comprising a conical seat surrounding the valve opening, a screw closure member having a hollow cylindrical portion that is closed at its upper end and open at its lower end and is open through the upper part of the wall thereof and having an outer annular flange at the upper end thereof, annular sealing means snugly surrounding and longitudinally movable upon said cylindrical portion and bearing against said annular flange so as to close the open upper part of said cylindrical portion when the valve is in closed position, a gasket of elastic sealing material having its inner surface of cylindrical form throughout its entire extent and having snug engagement with and being longitudinally movable upon the cylindrical portion of said screw member and adapted for engagement against the lower end of said annular sealing means, said last-named gasket having its outer surface provided with a portion of conical form corresponding to that of said seat for effective engagement thereupon.

2. A valve structure comprising a conical seat surrounding a valve opening, a gasket of elastic sealing material having its outer surface provided with a portion of conical form corresponding to that of said seat for removable engagement thereupon and with a cylindrical portion extending from the small end of said conical portion into the valve opening so as to center the same with respect thereto, the inner surface of said gasket being of cylindrical form throughout its entire extent, and a screw closure member having a hollow cylindrical portion extending in a snug manner through said gasket and having an annular flange at the upper end of said cylindrical portion, said gasket being movable along said cylindrical portion, said hollow cylindrical portion being open at its lower end and closed at its upper end and having passage means through the wall of the upper part thereof, and a plurality of alternating annular washers of elastic sealing and non-corrosive metallic materials arranged about said cylindrical hollow portion so as to have sealing engagement between said gasket and annular flange and to thereby close the passage means thereof when the valve is in closed position and to be moved to open position by the force of the liquid through said passage means when the valve is moved to open position.

References Cited in the file of this patent

UNITED STATES PATENTS

| | | | |
|---|---|---|---|
| 973,328 | Willman | Oct. 18, | 1910 |
| 1,383,005 | Mertens | June 28, | 1921 |
| 1,482,021 | Little | Jan. 29, | 1924 |
| 1,802,897 | Holden | Apr. 28, | 1931 |
| 1,919,856 | McGeorge | July 25, | 1933 |
| 2,132,894 | Esnard | Oct. 11, | 1938 |
| 2,219,843 | Lieb et al. | Oct. 29, | 1940 |
| 2,298,720 | Farrell | Oct. 13, | 1942 |

FOREIGN PATENTS

| | | | |
|---|---|---|---|
| 333,429 | Great Britain | of | 1930 |